United States Patent [19]

Fisher

[11] Patent Number: 5,746,001
[45] Date of Patent: May 5, 1998

[54] TEACHING RULER

[76] Inventor: Delores Fisher, 151 East St., South Salem, N.Y. 10590

[21] Appl. No.: 445,188

[22] Filed: May 19, 1995

[51] Int. Cl.⁶ .................................................. G01B 3/04
[52] U.S. Cl. ........................... 33/484; 33/494; 33/679.1
[58] Field of Search ........................... 33/484, 483, 485, 33/486, 487, 492, 494, 755, 759, 760, 679.1

[56] References Cited

U.S. PATENT DOCUMENTS

| | | | |
|---|---|---|---|
| 706,242 | 8/1902 | Latshaw | 33/494 |
| 1,498,485 | 6/1924 | Schmidtke | 33/484 |
| 1,602,490 | 10/1926 | Homan | 33/494 |
| 1,776,245 | 9/1930 | Barrett | 33/494 |
| 2,486,748 | 11/1949 | Koenig | 33/494 |
| 3,936,944 | 2/1976 | Byne | 33/494 |
| 4,547,969 | 10/1985 | Haack | 33/494 |
| 4,614,042 | 9/1986 | Maurer | 33/494 |
| 4,750,270 | 6/1988 | Kundikoff | 33/494 |
| 4,965,944 | 10/1990 | Kuze et al. | 33/760 |

*Primary Examiner*—Christopher W. Fulton

[57] ABSTRACT

A linear measurement ruler comprises a teaching aid for instruction in fractional and decimal units of linear measure.

10 Claims, 4 Drawing Sheets

5,746,001

TEACHING RULER

BACKGROUND OF THE INVENTION

The present invention relates to rulers and particularly to rulers for teaching recognition and understanding of fractions and fractional units of measurement.

The American system of linear measure is based on the foot as a unit of measure with the foot equalling 12 inches, and the inch divided into fractional parts including ½, ¼, ⅛, 1/16, 1/32, and so forth. A typical 12-inch ruler contains 1/16 gradations as well as ⅛, ¼, and ½ gradations for each inch of the ruler without any markings identifying the value of particular gradations. Instead a heirarchy of scribe marks along the edge of the rule differentiates adjacent gradations with the smallest fraction having the smallest scribe mark and larger fractions having relatively longer gradation scribe marks. A common arrangement is to differentiate 1/16, ⅛, and ¼ inch gradations by successively longer gradations. See U.S. Pat. No. 2,799,938 to Anderson, for example. The ½ inch gradation may be the same length as the ¼ inch mark in some rulers, and may be longer than the ¼ mark in others. The inch marks are enumerated and generally have the longest scribe mark.

This conventional ruler marking arrangement presupposes the user is quite familiar with fractional components of measure and need not be reminded that 5/16ths inch is smaller than ⅜ths inch. Nonetheless, not everyone is so familiar with fractional units of measure and many would benefit by having a readily available means for assuring correct measurements. In the case of students being instructed in units of measurement, it is a very useful to make fractionally marked gradations available on rulers to enable the students in understanding of the overall system of measurement as well as the relative value of specific fractions.

In addition to the above-described rulers, there are in common use metric rulers demarked in centimeters and millimeters as well as foot rulers demarked in tenths. These rulers are provided with scribe marks without numerical value being indicated for decimal components of the centimeter or inch. Here again, it is a very useful to make decimal marked gradations available on rulers to enable students and occasional users in understanding of the overall system of measurement as well as the relative value of specific gradations.

SUMMARY OF THE INVENTION

The present invention comprises a teaching aid for instruction in fractional and decimal units of linear measure.

In a preferred form of the invention, a ruler comprises an elongate rectangular body preferably bevelled on both longitudinal edges and provided with scales, foot-inch and metric, along the bevelled edges. The central section of the ruler between the bevelled edges is provided with a slide of predetermined length, one inch for example. The slide is marked with gradations which register with the gradations of one or both the edge scales. In addition, the slide gradations contain numerical values indicating length in fractions or decimals of an inch enabling the user in understanding fractional or decimal lengths measured by the edge scales. In a typical lesson, the student uses an edge scale for measuring and marking a distance, say 2⅜ths inches, designated by the instructor. The student may then utilize the slide to verify the fractional portion of the distance measured. This is done by registering the valued fractional slide gradations with the unvalued fractional edge gradations lying in the 2–3 inch range of the edge scale.

Similarly, the slide contains value marked metric gradations 1 mm, 2 mm, 3 mm and so forth for registry with unvalued gradations along the metric scale of the ruler for providing instruction in and understanding of metric measure.

In another aspect of the invention, a ruler, tape measure, or encased flexible steel tape measure is marked with a given unit of length, one inch for example, with gradations in fractions or decimals and with the gradations valued according to length, i.e., 1/16th, ⅛th, ¼th, or 0.10th, 0.20th, 0.30th, and so forth of an inch. This valued set of gradations may be marked on a representative length of the ruler or tape such as the first or last inch for example, or can be marked by suitable means on the casing as for example on the casing of a Stanley Powerlock brand measuring tape.

In still another aspect of the invention, a ruler of standard length, 12 inches for example, is marked along one edge with valued fractional or decimal gradations throughout the full length of the ruler. In one embodiment, each inch of the rule has valued gradations of 1/16th through 1 inch. The ruler is also divided into a set of parallel bands extending from zero to twelve inches along the top face of the ruler with each band being parallel to the measuring edge of the ruler. Each valued gradation mark extends transversely of the ruler face in the usual manner, however in accordance with the invention, the gradations extend into one of the bands according to the value of the gradation. Thus, all twelve inch gradation marks extend across the top face of the ruler and terminate in a common band with the band labelled "inches". Similarly, ½ inch, ¼ inch, ⅛ inch, 1/16 inch gradations all extend across the top face of the ruler terminating in common bands labelled "halves", "quarters", "eights" and "sixteenths", respectively.

OBJECTS OF THE INVENTION

It is an object of the invention to provide an aid for instruction in linear measurement particularly in comprehension of fractions and decimals of units of length.

It is an object of the invention to provide a ruler or other measuring tool with a valued, demarked unit of length for comparison with standard unvalued markings commonly used in rulers.

It is a further object of the invention to provide a sliding unit of length on a ruler with the sliding unit having valued gradations for registry with the unvalued gradations along the edge of the rule as an instruction aid.

It is a further object of the invention to provide a fixed unit of length on a ruler or tape measure with the fixed unit having valued gradations corresponding to the unvalued gradations as an instruction aid.

It is a further object of the invention to provide a ruler with valued gradations throughout the length of the rule, with the gradations extending into labelled bands which differentiate the gradations according to fractional value.

Other and further objects of the invention will occur to one skilled in the art with an understanding of the following detailed description of the invention or upon employment of the invention in practice.

DESCRIPTION OF THE DRAWING

A preferred embodiment of the invention has been chosen for purposes of illustrating the construction and operation of the invention and is shown in the accompanying drawing in which.

DETAILED DESCRIPTION OF THE INVENTION

Figure 1:
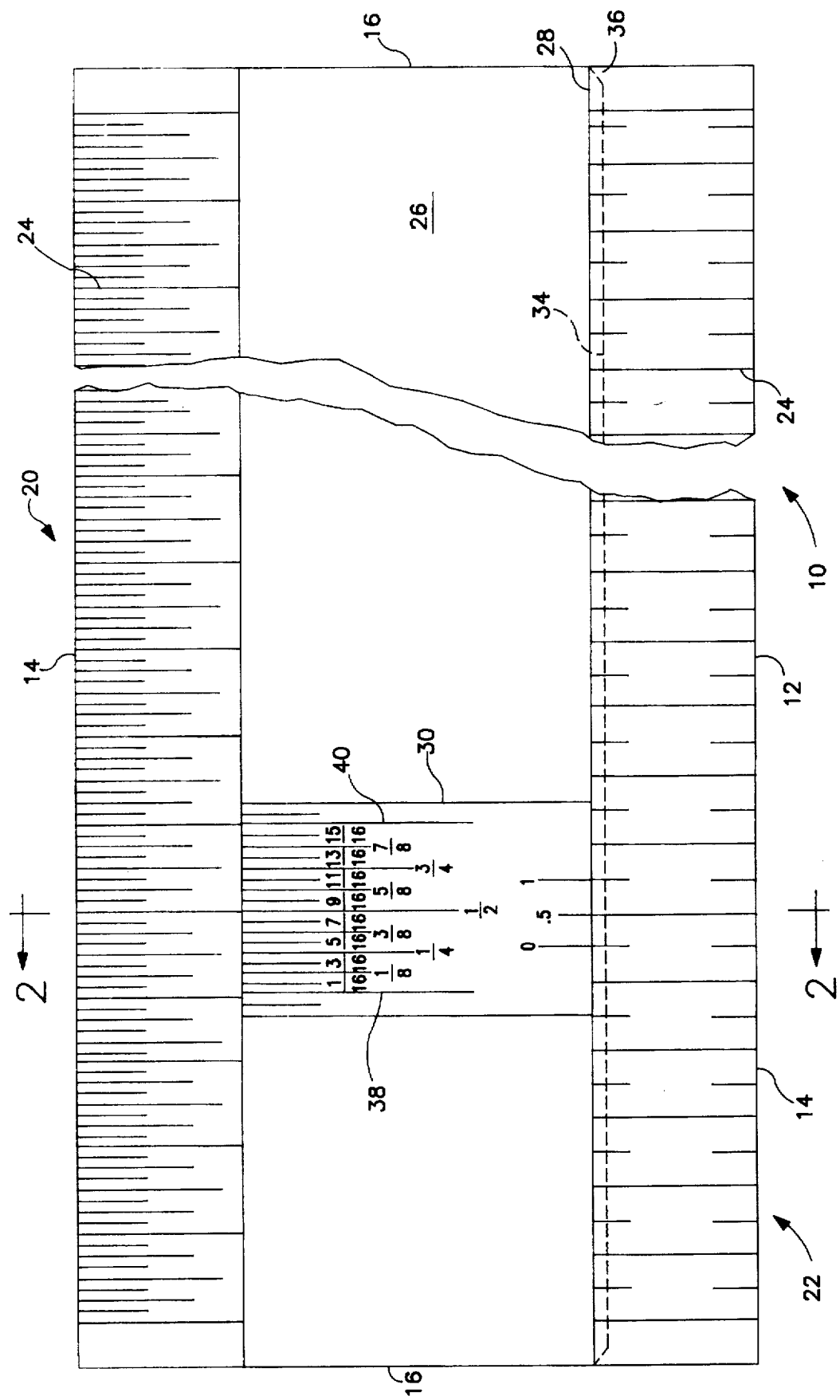
FIG. 1 is a plan view of a preferred embodiment of ruler according t o the invention.
Figure 2:
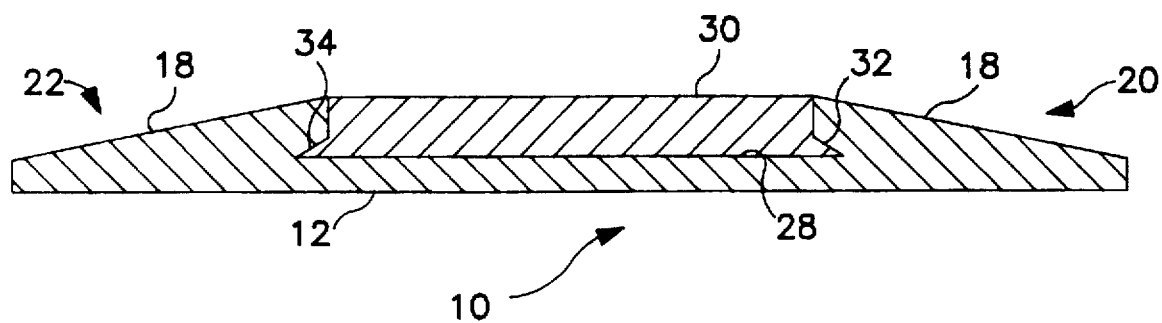
FIG. 2 is a section view taken along line 2—2 of FIG. 1.

Referring t o the drawing FIGS. 1 and 2, a ruler 10 according to the invention comprises an elongate rectangular body 12 with side 14 and end 16 edges and being fabricated of suitable material such as wood, molded plastic, steel and the like for dimensional stability and durability suited for intended use of the ruler. The ruler body is preferably bevelled 18 along both longitudinal edges and is inscribed or gradated with linear scales of measurement, foot-inch 20 and metric 22, along the bevelled edges. Both the foot-inch and metric scales are shown reading from left to right in FIG. 1, however, in practice the lower scale would appear upside down in FIG. 1 in order to read left to right when the ruler is rotated 180 degrees to use the metric scale.

The foot-inch scale is one foot long and is divided into a series of repeat basic measurement units of one inch and with each basic measurement unit being further subdivided into fractional measurement units of 1/16th inch each. The metric scale is a 30 centimeters long and is divided into a series of repeat basic measurement units of one centimeter and with each basic measurement unit being further subdivided into fractional measurement units of one millimeter each. The gradation marks 24 along each edge indicate specific units of length, as for example sixteenths or tenths of an inch for the foot-inch scale, and millimeters for the metric scale, however, the gradations are not valued or identified with specific fractional or decimal numbers.

The central section 26 of the ruler between the bevelled edges contains a channel 28 extending the full length of the ruler to receive a comparator slide 30 which many be moved freely along the length of the ruler. The slide is retained for sliding movement in the channel by means of projections 32 extending into grooves 34 along each side of the channel. Each end of each groove is closed at 36 to prevent separation of slide and ruler. The slide is provided with a scale 38 of predetermined length, one inch for example, and is marked with gradations 40 which register with the gradations of one or both the ruler edge scales 20, 22. As shown, a foot-inch scale is marked with 1/16 gradations with a specific value, i.e., 1/16, 1/8, 3/16, 1/4, 5/16, and so forth for each slide gradation. The numerical values indicating length in fractions or decimals of an inch enable the user in understanding fractional or decimal lengths measured by the edge scales. The edge scale measures a distance, say 2⅜ths inches, and the comparator slide is aligned with the 2–3 inch portion of the scale to verify the fractional portion of the distance measured.

Similarly, the slide contains value marked metric gradations 1 mm, 2 mm, 3 mm and so forth for registry with unvalued gradations along the metric scale of the ruler for providing instruction in and understanding of metric measure.

Figure 3:
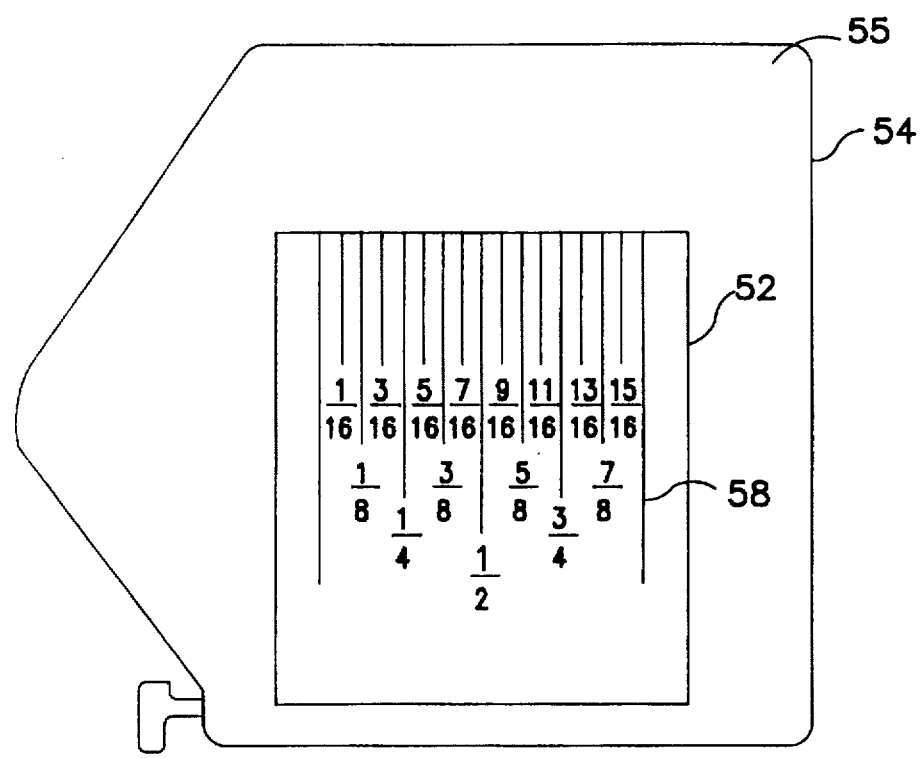
FIG. 3 is a modified embodiment of the invention.
Figure 9:
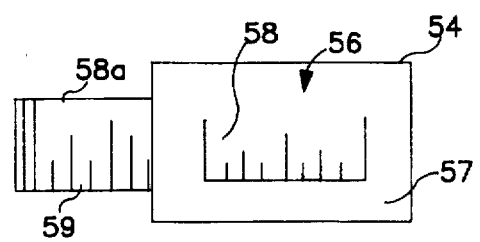
FIG. 9 is a modified embodiment of the invention.

In another aspect of the invention, a ruler, tape measure, or encased flexible steel tape measure 54 is marked at 56 with a given unit of length, one inch for example, with gradations 58 in fractions or decimals and with the gradations having inscribed values according to length, i.e., 1/16th, 1/8th, 1/4th, or 0.10th, 0.20th, 0.30th, and so forth of an inch. This valued set of gradations may be marked on a representative length of the ruler or tape such as the first or last inch for example, or can be marked by suitable means on the casing as for example on the side panel 55 of a Stanley Powerlock brand measuring tape 54 shown in FIG. 3. In this position the valued unit length serves as a teaching aid for students, or as a reminder for infrequent or casual users of the tape or ruler. As shown in FIG. 9, the tape measure casing 54 may be marked on the top panel 57 with a given unit of length 56, one inch for example, with gradations 58 in fractions or decimals and with the gradations valued according to length, i.e., 1/16th, 1/8th, 1/4th, or 0.10th, 0.20th, 0.30th, and so forth of an inch to match the unvalued gradations 58a of the tape measure. The unit of length marker 56 can be applied in any suitable manner as embossing, a printed stick-on label and so forth. Placement of the marker on the top panel facilitates direct comparison of the unvalued gradations 58a appearing on tape 59 with the valued gradations 58 of the marker.

Figure 4:
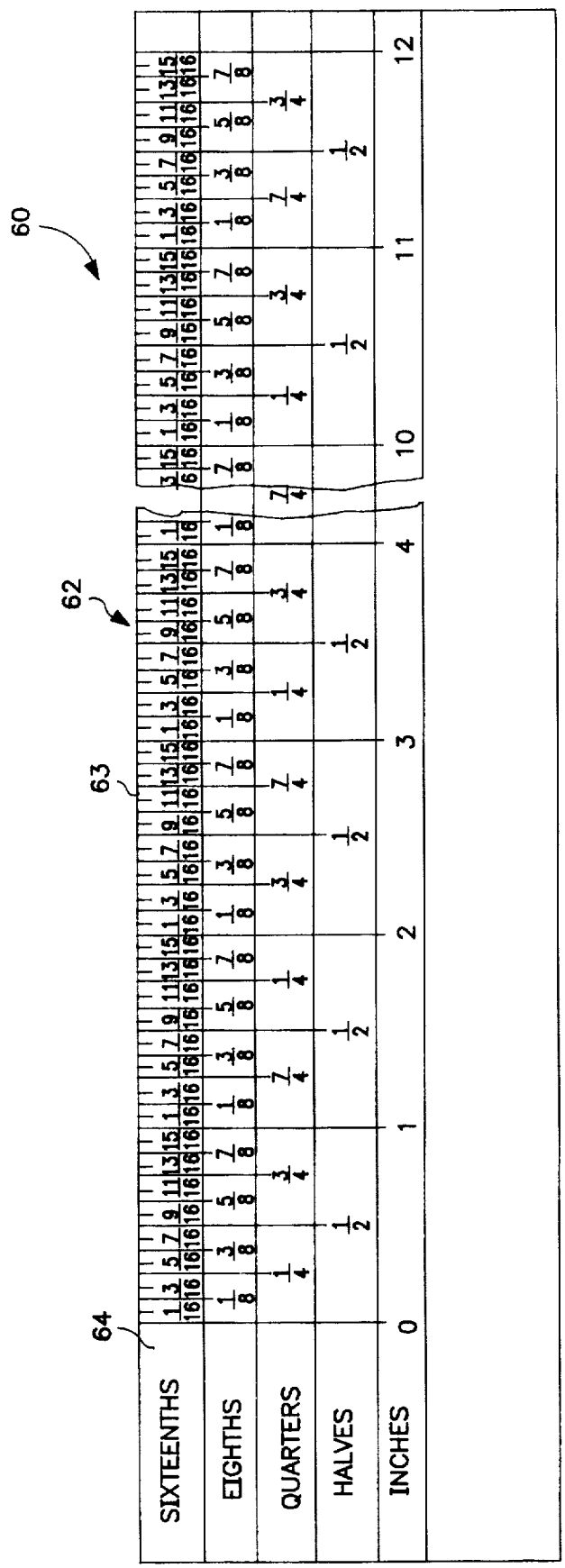
FIG. 4 is another embodiment of the invention.

In still another aspect of the invention shown in FIG. 4, a ruler 60 of standard length, 12 inches for example, is marked along one measuring edge 62 with valued fractional or decimal gradations 63 throughout the full 12 inch length of the ruler. In a preferred embodiment, each inch of the rule is marked with valued gradations of 1/16th through 1 inch. The top face 64 of the ruler is also divided into a set of five parallel bands 66 extending longitudinally of the face from zero to twelve inches with each band being parallel to the measuring edge of the ruler. Each valued gradation mark extends transversely of the ruler face terminating in one of the bands according to the value of the gradation. Thus, all twelve inch gradation marks extend across the top face of the ruler and terminate in a common band with the band labelled "inches". Similarly, ½ inch, ¼ inch, ⅛inch, 1/16 inch gradations all extend across the top face of the ruler terminating in common bands labelled "halves", "quarters", "eights" and "sixteenths", respectively. With this ruler a pupil can perform measurements, read fractions, and develop an understanding of the relative value of the fractions. The pupil will see that 9/16 is greater than ½, 7/16 is less than ½ and so forth. If desired, each of the bands may be colored for distinctness.

FIGS. 5–8 illustrate additional modified embodiments of the invention.

Figure 5:
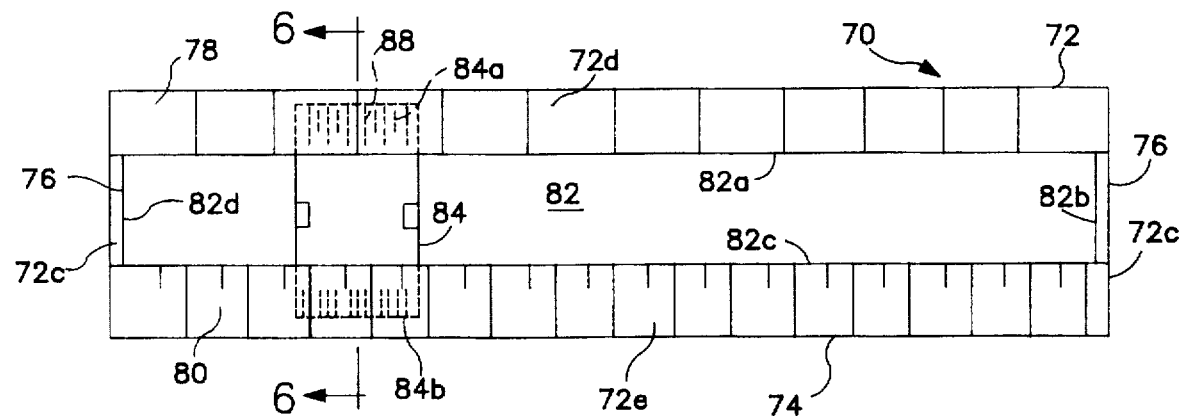
FIG. 5 is a modified embodiment of the invention.
Figure 6:
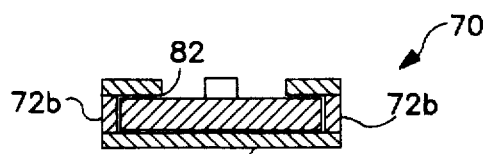
FIG. 6 is a section view taken along line 6—6 of FIG. 5.

In FIGS. 5 and 6, a ruler 70 according to the invention comprises an elongate rectangular body 72 with side 74 and end 76 edges and is fabricated of suitable material for dimensional stability and durability suited for intended use of the ruler. The ruler body includes a bottom panel 72a, side 72b and end 72c panels and transparent ruler top panels 72d, 72e along both longitudinal side edges 74. Each ruler panel is inscribed or gradated with unvalued linear scales of measurement, foot-inch 78 and metric 80. Both the foot-inch and metric scales shown in FIGS. 5 and 6 are similar to those of FIGS. 1 and 2 as described above.

The ruler panels 72a–72e enclose an interior chamber 82 with an access opening defined by panel edges 82 a–d (FIG. 5) extending the full length of the ruler and receiving a comparator slide 84. The scale may be moved freely along the length of the ruler. The slide is a rectangular block and is retained in the chamber by the top, side and end panels. The upper 84a and lower 84b portions of the transparent slide underlie the linear scales inscribed on the transparent ruler top panels 72d–e. The slide which may also be transparent is provided with a scale 86a of predetermined length, one inch for example, and is marked with gradations 88 which register with the gradations of the ruler edge scale 78. As shown, a foot-inch scale is marked with 1/16 gradations with a specific value, i.e., 1/16, 1/8, 3/16, 1/4, 5/16, and so forth for each slide gradation.

Similarly, the slide contains a scale 86b with value marked metric gradations 1 mm, 2 mm, 3 mm and so forth for registry with unvalued gradations along the metric scale 80 of the ruler for providing instruction in and understanding of metric measure.

The slide 84 is also fitted with suitable means such as lugs 84a for moving the slide.

Figure 7:
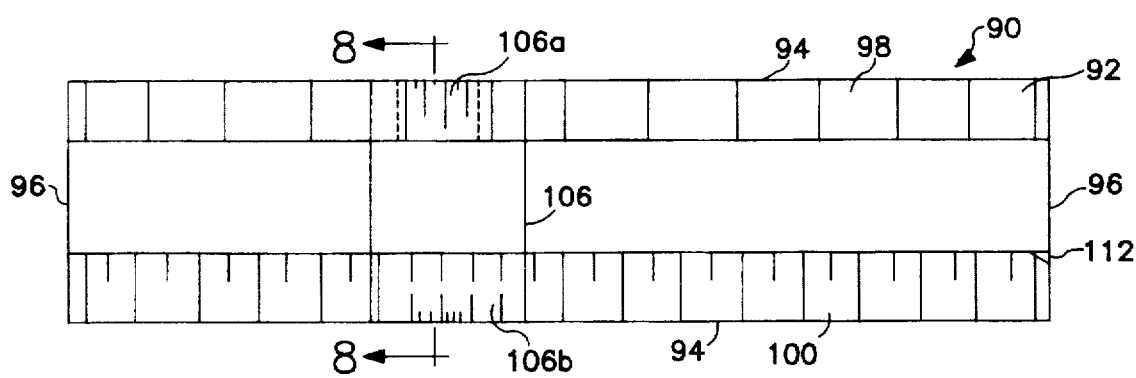
FIG. 7 is a modified embodiment of the invention.
Figure 8:
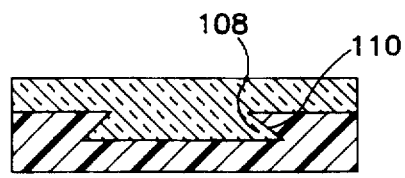
FIG. 8 is a section view taken along line 8—8 of FIG. 7.

In FIGS. 7 and 8, a ruler 90 according to the invention comprises an elongate rectangular body 92 with side 94 and end 96 edges and being fabricated of suitable material as for example transparent plastic. The ruler body is inscribed or gradated with linear scales of measurement, foot-inch 98 and metric 100, along both longitudinal edges in a manner similar to FIGS. 5 and 6.

The central section 102 of the ruler between the ruled edges contains a channel 104 extending the full length of the ruler to receive a transparent comparator slide 106 which many be moved freely along the length of the ruler. The slide is retained for sliding movement in the channel by means of projections 108 extending into grooves 110 along each side of the channel. Each end of each groove is closed at 112 to prevent separation of slide and ruler. The upper 106a and lower 106b portions of the transparent slide overlie the linear scales inscribed on the ruler. The slide is provided with a scale 114 of predetermined length, one inch for example, and is marked with gradations 116 which register with the gradations of the ruler edge scale 98. As shown, a foot-inch scale is marked with 1/16 gradations with a specific value, i.e., 1/16, 1/8, 3/16, 1/4, 5/16, and so forth for each slide gradation as in the case of FIGS. 5 and 6.

Similarly, the slide contains scale 116 with value marked metric gradations 1 mm, 2 mm, 3 mm and so forth for registry with unvalued gradations along the metric scale 100 of the ruler for providing instruction in and understanding of metric measure.

I claim:

1. A teaching ruler comprising an elongate rectangular body having a top face and opposite, parallel longitudinal edges, a linear measurement scale along one of the edges, the scale being divided by gradation marks into a series of repeat basic measurement units and with each unit subdivided by gradation marks into fractions of the basic measurement units, a comparator slide mounted on the top face of the ruler for movement along substantially the full length of the top face, the comparator slide having a parallel edge that is and remains parallel to the measurement scale edge throughout the full range of movement of the slide along the ruler, the parallel edge of the comparator slide having a comparator scale equal in length to a basic measurement unit and having gradation marks subdividing the basic measurement into fractions of predetermined length, the fractional gradation marks of the comparator scale having a fraction inscription indicating the fractional value of the gradation mark in the comparator scale, the comparator scale being slidable into a position on the ruler with the comparator scale gradation marks aligned with the corresponding fractional gradation marks of any one of the series of repeat basic measurement units along the edge of the ruler, the linear measurement scale and the comparator scale each having successively longer gradations to differentiate smaller to larger fractional value gradations, and the gradation marks of the linear measurement scale being fully visible for comparison with the comparator scale gradation marks to enable the user to understand and comprehend the value of the edge scale fractional gradation marks.

2. A teaching ruler as defined in claim 1 which further includes a second linear measurement scale along the other edge of the ruler, the second scale being divided by gradation marks into a series of repeat basic measurement units and with each unit subdivided by gradation marks into fractions of the basic measurement units, the comparator slide having a second parallel edge that is and remains parallel to the second linear measurement scale edge throughout the full range of movement of the slide along the ruler, the second parallel edge of the comparator slide having a second comparator scale equal in length to a basic measurement unit of the second scale and having gradation marks subdividing the basic measurement into fractions of predetermined length, the fractional gradation marks of the second comparator scale having a fraction inscription indicating the fractional value of the gradation mark in the comparator scale, the second comparator scale being slidable into a position on the ruler with the comparator scale gradation marks aligned with the corresponding fractional gradation marks of any one of the series of repeat basic measurement units along the other edge of the ruler, and the gradation marks of the second linear measurement scale being fully visible for comparison with the second comparator scale gradation marks.

3. A teaching ruler as defined in claim 2 in which the opposite parallel edges are bevelled.

4. A teaching ruler as defined in claim 1 in which the top face of the ruler contains a longitudinal channel and in which the comparator slide is positioned in the channel for sliding movement along the length of the ruler.

5. A teaching ruler as defined in claim 1 in which the repeat basic measurement units are inches and the subdivided gradation marks are 1/16 th of an inch.

6. A teaching ruler as defined in claim 2 in which the repeat basic measurement units are inches and the subdivided gradation marks are 1/16 th of an inch, and in which the second repeat basic measurement units are centimeters and the second subdivided gradation marks are millimeters.

7. A teaching ruler comprising an elongate retangular body having a top face opposite, parrallel longitudinal edges, a linear measurement scale along one of the edge, the scale being divided by gradation marks into a series of repeat basic measurement units from zero to twelve inch and with each unit subdivided by gradation marks into fractions of the basic measurement units, each gradation of the ruler being marked with fraction inscription indicating the fractional value of each gradation mark, the top face of the ruler being divide into a set of parrellel band extending longitudinally of the face from zero to twelve inches with each band being parrellel to the measuring edge of the ruler, each gradation valued mark. extending transversely of the ruler face and terminating in one of the bands according to the fractional value of the gradation, and each said band having a world label to indicate a fractional value common to all gradational marks terminating in said band.

8. A teaching ruler as defined in claim 7 in which the repeat basic measurement unit is one inch, with each basic measurement unit subdivided in 1/16 inch fractions, with five bands and with the bands labllled to indicate the fractional value of the gradation marks terminating in each band in sixteenths, eighths, quarters, and halves of an inch.

9. A teaching ruler comprising an elongate rectangular body having a transparent top face and opposite, parallel longitudinal edges, a linear measurement scale along one of the edges, the scale being divided by gradation marks into a series of repeat basic measurement units and with each unit subdivided by gradation marks into fractions of the basic measurement units, the ruler body having a chamber with an access opening through the top face of the ruler, a comparator slide mounted in the chamber for movement along substantially the full length of the top face, the comparator slide having a parallel edge that is and remains parallel to the measurement scale edge throughout the full range of movement of the slide along the ruler, the parallel edge of the comparator slide having a comparator scale equal in length to a basic measurement unit and having gradation marks subdividing the basic measurement into fractions of predetermined length, the fractional gradation marks of the comparator scale having a fraction inscription indicating the fractional value of the gradation mark in the comparator scale, the comparator scale being slidable into a position on the ruler with the comparator scale gradation marks aligned with the corresponding fractional gradation marks of any one of the series of repeat basic measurement units along the edge of the transparent top face of the ruler, the linear measurement scale and the comparator scale each having successively longer gradations to differentiate smaller to larger fractional value gradations, and the gradation marks of the linear measurement scale being fully visible for comparison with the comparator scale gradation marks to enable the user to understand and comprehend the value of the edge scale fractional gradation marks.

10. A teaching ruler comprising an elongate rectangular body having a top face and opposite, parallel longitudinal edges, a linear measurement scale along one of the edges, the scale being divided by gradation marks into a series of repeat basic measurement units and with each unit subdivided by gradation marks into fractions of the basic measurement units, a longitudinal channel extending along the top face in parallel with the longitudinal edges, a transparent comparator slide positioned in the channel for movement along substantially the full length of the top face, the comparator slide having a parallel edge that is and remains parallel to and overlies the measurement scale edge throughout the full range of movement of the slide along the ruler, the parallel edge of the comparator slide having a comparator scale equal in length to a basic measurement unit and having gradation marks subdividing the basic measurement into fractions of predetermined length, the fractional gradation marks of the comparator scale having a fraction inscription indicating the fractional value of the gradation mark in the comparator scale, the comparator scale being slidable into a position on the ruler with the comparator scale gradation marks aligned with the corresponding fractional gradation marks of any one of the series of repeat basic measurement units along the edge of the ruler, the linear measurement scale and the comparator scale each having successively longer gradations to differentiate smaller to larger fractional value gradations, and the gradation marks of the linear measurement scale being fully visible for comparison with the comparator scale gradation marks to enable the user to understand and comprehend the value of the edge scale fractional gradation marks.

\* \* \* \* \*